United States Patent [19]

Walp

[11] Patent Number: 4,959,844
[45] Date of Patent: Sep. 25, 1990

[54] CLOCK RECOVERY CIRCUIT FOR DIGITAL DEMODULATOR

[75] Inventor: Patrick K. Walp, Penngrove, Calif.

[73] Assignee: AMP Incorporated, Harrisburg, Pa.

[21] Appl. No.: 426,367

[22] Filed: Oct. 24, 1989

[51] Int. Cl.$^5$ ............................................. H04L 27/06
[52] U.S. Cl. ...................................... 375/97; 375/120; 375/39; 329/307; 329/325
[58] Field of Search ......... 375/39.81, 97, 98, 118–120, 375/102; 331/1 R, 25, 17, 1 A; 329/327, 307, 325

[56] References Cited

U.S. PATENT DOCUMENTS

| | | | |
|---|---|---|---|
| 4,344,176 | 8/1982 | Qureshi | 375/15 |
| 4,458,356 | 7/1984 | Toy | 375/39 X |
| 4,535,459 | 8/1985 | Hogge, Jr. | 375/80 |
| 4,625,180 | 11/1986 | Kamakura et al. | 331/2 |
| 4,649,551 | 3/1987 | Sander et al. | 375/81 |
| 4,667,170 | 5/1987 | Lofgren et al. | 331/17 |
| 4,677,395 | 6/1987 | Baker | 331/25 |
| 4,687,999 | 8/1987 | Desperben et al. | 375/39 X |
| 4,689,581 | 8/1987 | Talbot | 331/1 A |
| 4,712,077 | 12/1987 | Ansell et al. | 331/25 |
| 4,809,306 | 2/1989 | Somer | 375/120 |
| 4,862,104 | 8/1989 | Muratani et al. | 331/17 X |
| 4,879,728 | 11/1989 | Tarallo | 375/97 X |

OTHER PUBLICATIONS

Universal Carrier Recovery Loop for QASK and PSK Signal Sets, IEEE Tran. in Comm., vol. com 31, No. 1, Jan. 1983, pp. 130–136.
"Carrier Synchronization and Detection of QASK Signal Sets", by Simon and Smith, IEEE Trans. on Comm., vol. 22, 2/1974, pp. 98–106.
"Offset Quadrature Communications with Decision–Feedback Carrier Synchronization", by Simon and Smith, IEEE Trans. on Comm., vol. 22, 10/1974, pp. 1574–1584.
"A Bandwidth Compressive Modulation System Using Multi–Amplitude Minimum Shift Keying (MAMSK)", by Weber et al., IEEE Trans. on Comm., vol. 26, 5/1978, pp. 543–551.

*Primary Examiner*—Douglas W. Olms
*Assistant Examiner*—B. Tesfaldet
*Attorney, Agent, or Firm*—David L. Smith

[57] ABSTRACT

A digital demodulator (10) operates by multiplying an input signal with first and second orthogonal demodulation reference signals (LOa, LOb) to generate respective product signals, which are then integrated to generate first and second integrated values (a, b) indicative of digital data encoded in the input signal. These integrated values (a, b) are digitized to generate first and second digital values (â, b̂). A first error signal a-â indicative of the difference between the first integrated value (a) and the first digital value (â) is generated, and the first error signal (a-â) is combined with the second digital value (b) to generate a first feedback signal. This first feedback signal is utilized to generate a control signal (ab-bâ) indicative of phase difference between the input signal and the demodulation reference signals (LOa, LOb).

7 Claims, 9 Drawing Sheets

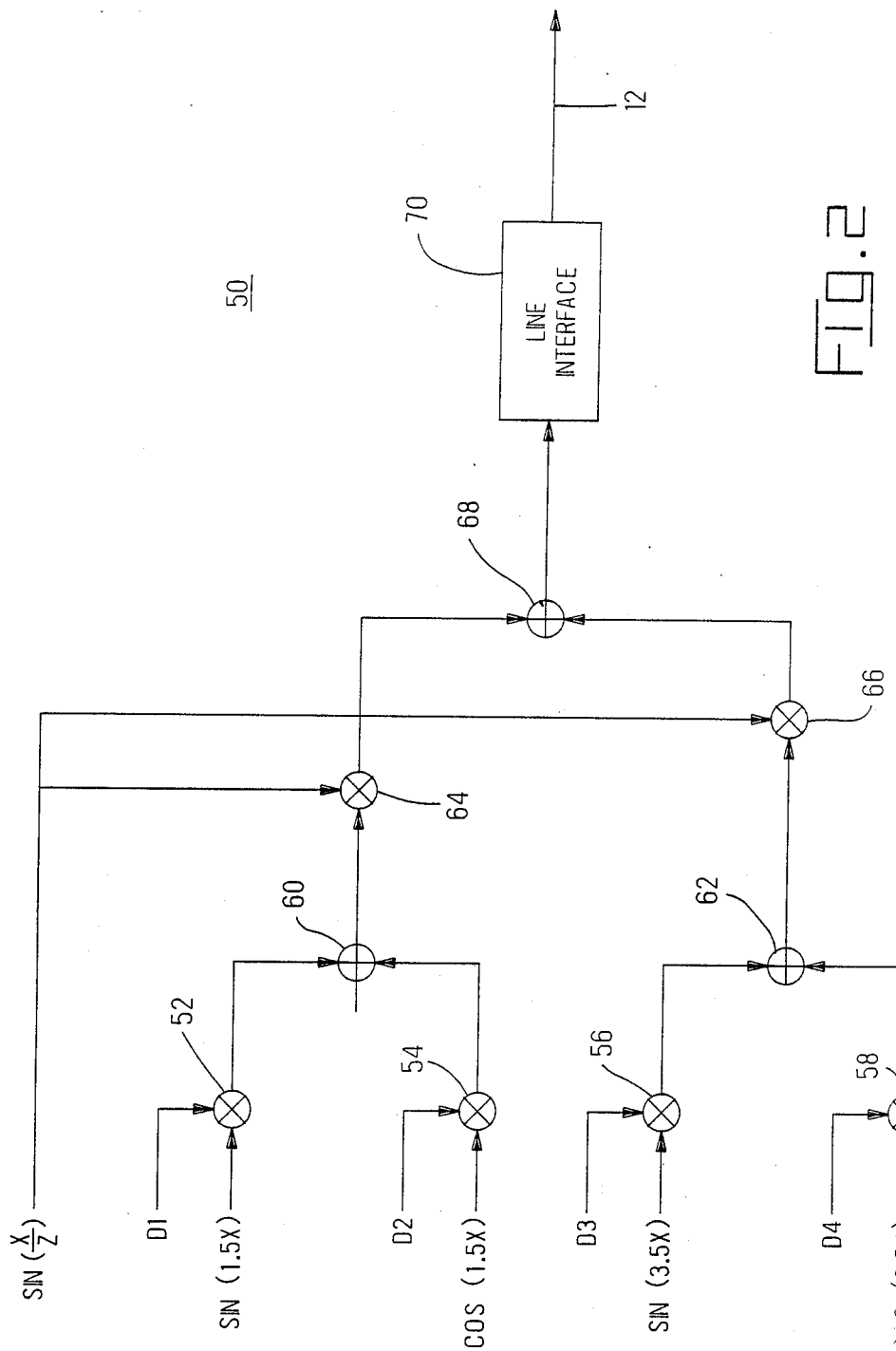

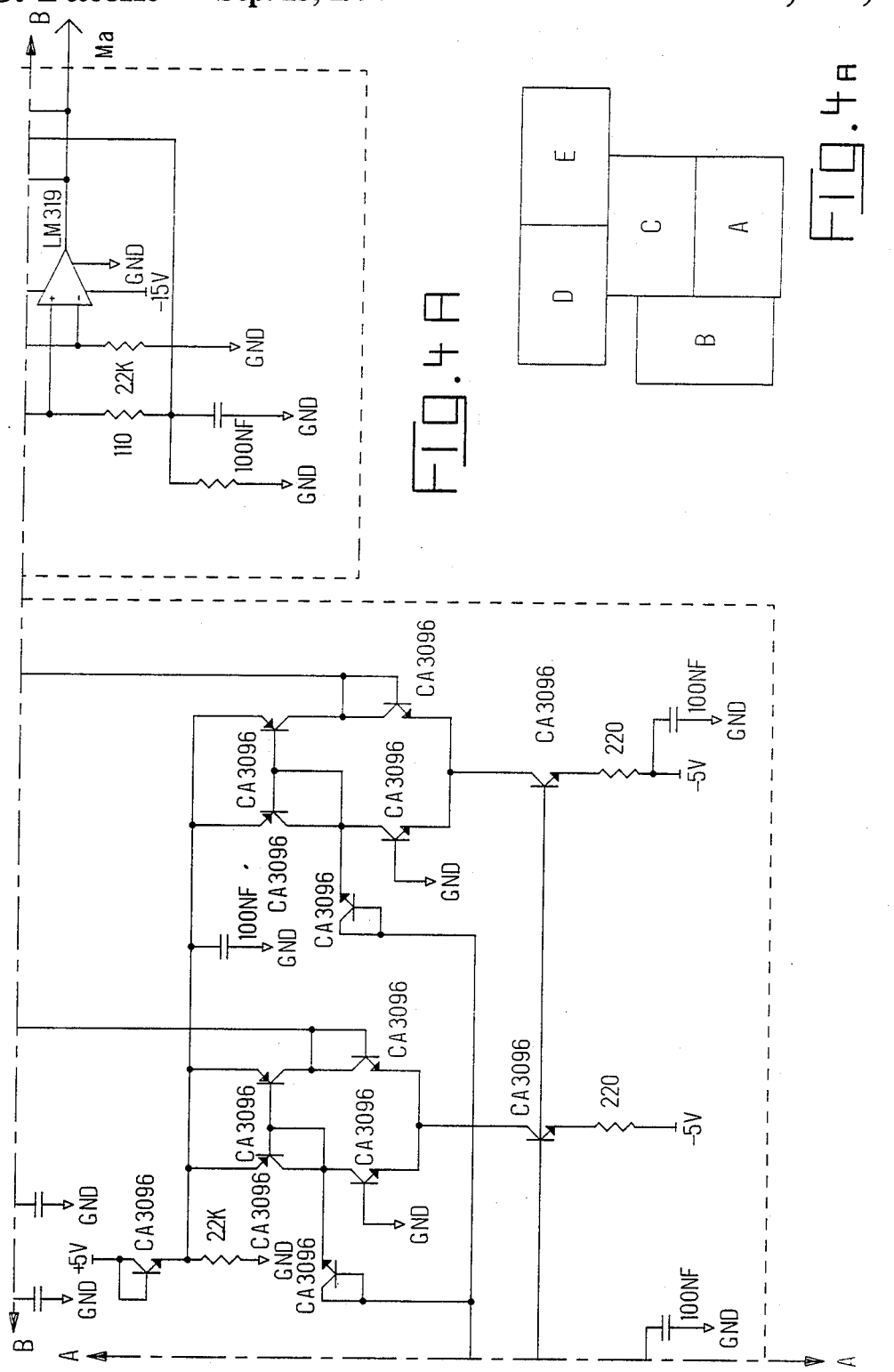

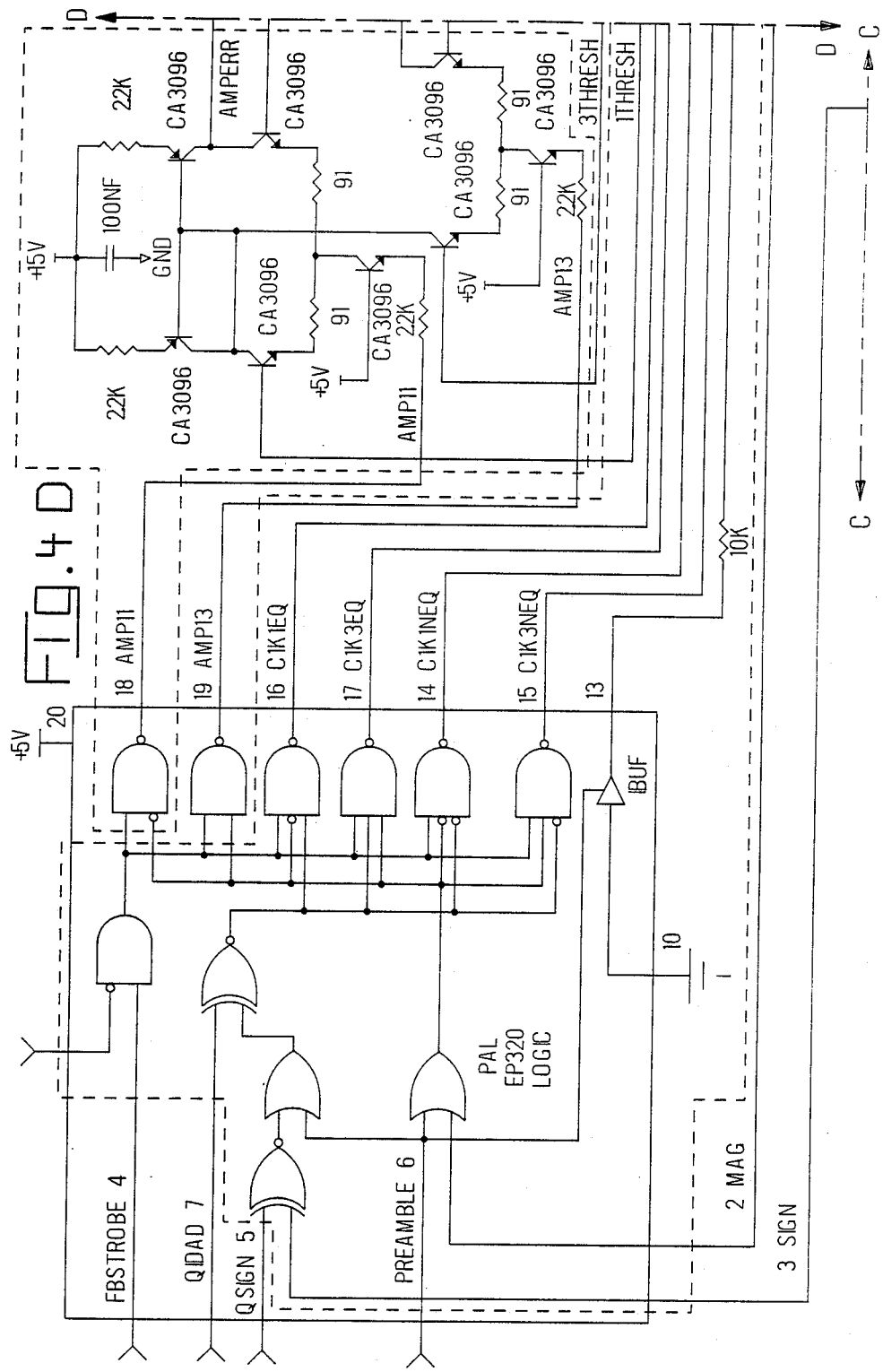

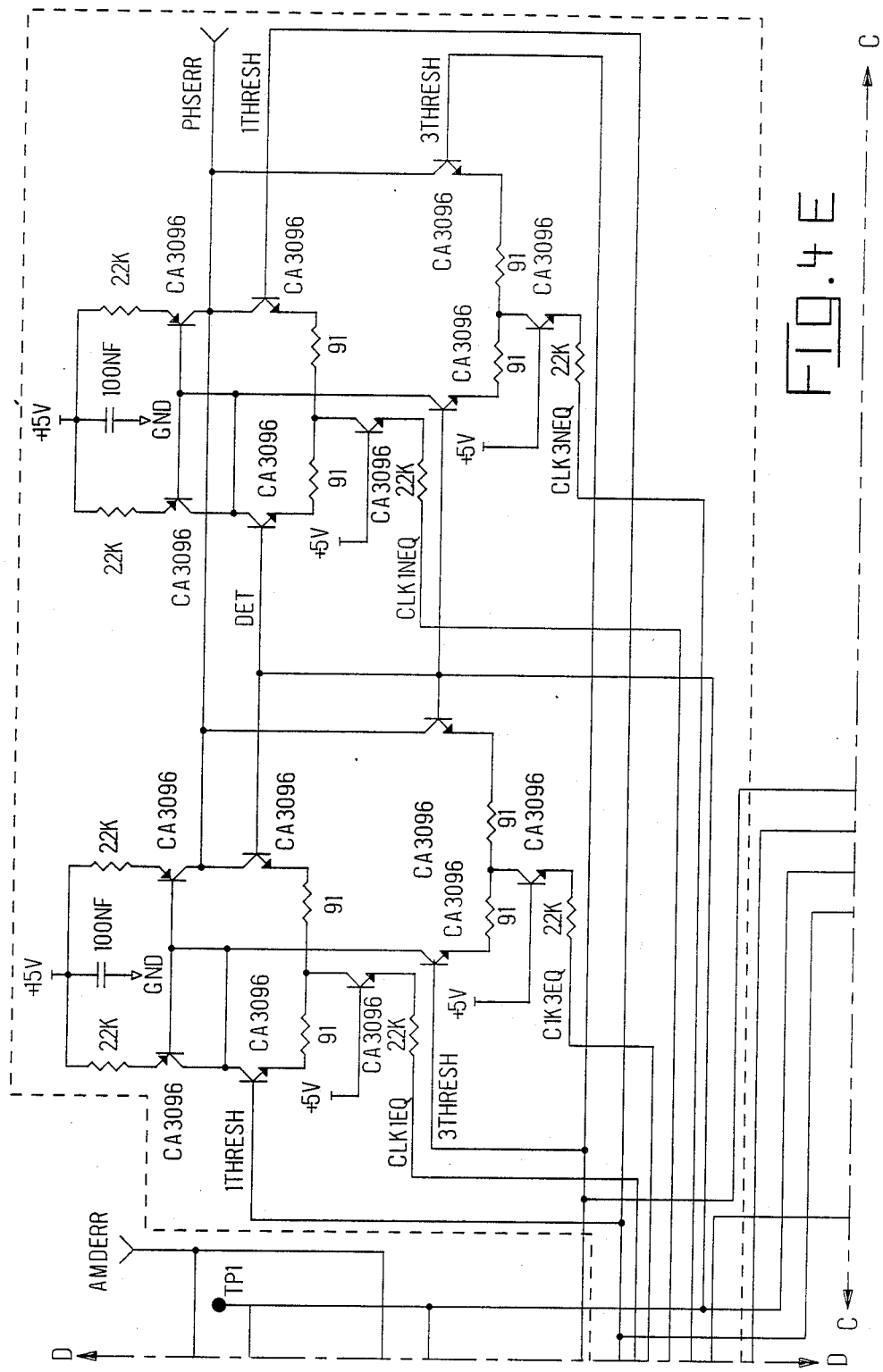

CLOCK RECOVERY CIRCUIT FOR DIGITAL DEMODULATOR

BACKGROUND OF THE INVENTION

This invention relates to a clock recovery circuit for a digital demodulator of the type comprising means for multiplying an input signal with first and second orthogonal demodulation reference signals to generate respective product signals, means for integrating the product signals to generate first and second integrated values indicative of digital data encoded in the input signal, and means for digitizing the integrated values to generate first and second digital values Digital demodulators of the general type described above are well known to those skilled in the art, as for example in Quadrature Amplitude Modulation (QAM) systems. Typically, a plurality of separate component signals are combined to form a composite signal which is transmitted on a single signal channel, and each signal is orthogonal to the others and is amplitude modulated. When the received composite signal is multiplied by an appropriate local oscillator signal and the resulting product is integrated over an integral number of symbol periods, the resulting integration is indicative of the amplitude of a respective one of the component signals of the composite signal.

"Offset Quadrature Communications with Decision-Feedback Carrier Synchronization" (Marvin K. Simon and Joel G. Smith, IEEE Transations on Communications Volume Com-22 No. 10, Oct. 1974, Pages 1576–1584) discloses a related offset quadrature phase shift keyed system which utilizes a voltage controlled oscillator to generate the local oscillator signals. The frequency and phase of this oscillator are controlled in a feedback loop. The oscillator generates demodulation reference signals which are multiplied with the incoming signal in multipliers. The resulting products are integrated and then quantized to produce two digitized values. As shown in FIG. 3 of the Simon ,e/uns/et al./ article, the feedback loop for the voltage controlled oscillator includes two feedback signals which are summed to create a control signal e(t). Each of these feedback signals is generated as the product of the digitized value of one channel with the delayed product value of the other channel.

This approach places considerable demands on the multipliers. Since the analog input channel of each multiplier receives the product value from a respective channel, each multiplier must remain linear over a considerable range of product values. Such multipliers, though possible to create, can be undesirably expensive in many applications.

It is a primary object of the present invention to provide an improved clock recovery system which reduces the range of analog inputs to such multipliers in clock recovery feedback loops, and thereby reduces the complexity and the cost of the hardware required to implement the system.

SUMMARY OF THE INVENTION

According to this invention, a digital demodulator of the type described initially above is provided with means for generating an error signal indicative of the difference between a first integrated value and a first digitized value. Means are also provided for combining the error signal with a second digital value to generate a feedback signal, and means are provided for utilizing the feedback signal to generate a control signal indicative of a phase difference between the input signal and the demodulation reference signals.

A primary advantage of this invention flows from the fact that the combining means combines the error signal with the second integrated value. The error signal itself is indicative of the difference between the integrated and digitized values, and will typically be much smaller in range than the first integrated value itself. For this reason, when the combining means is implemented with a multiplier, the multiplier only must operate with a relatively narrow range of analog input values. In this way the cost and complexity of the multiplier are reduced.

BRIEF DESCRIPTION OF THE DRAWINGS

FIG. 2 is a block diagram of a transmitter suitable for use with the receiver of FIG. 1.

DETAILED DESCRIPTION OF THE PREFERRED EMBODIMENT

Figure 1:
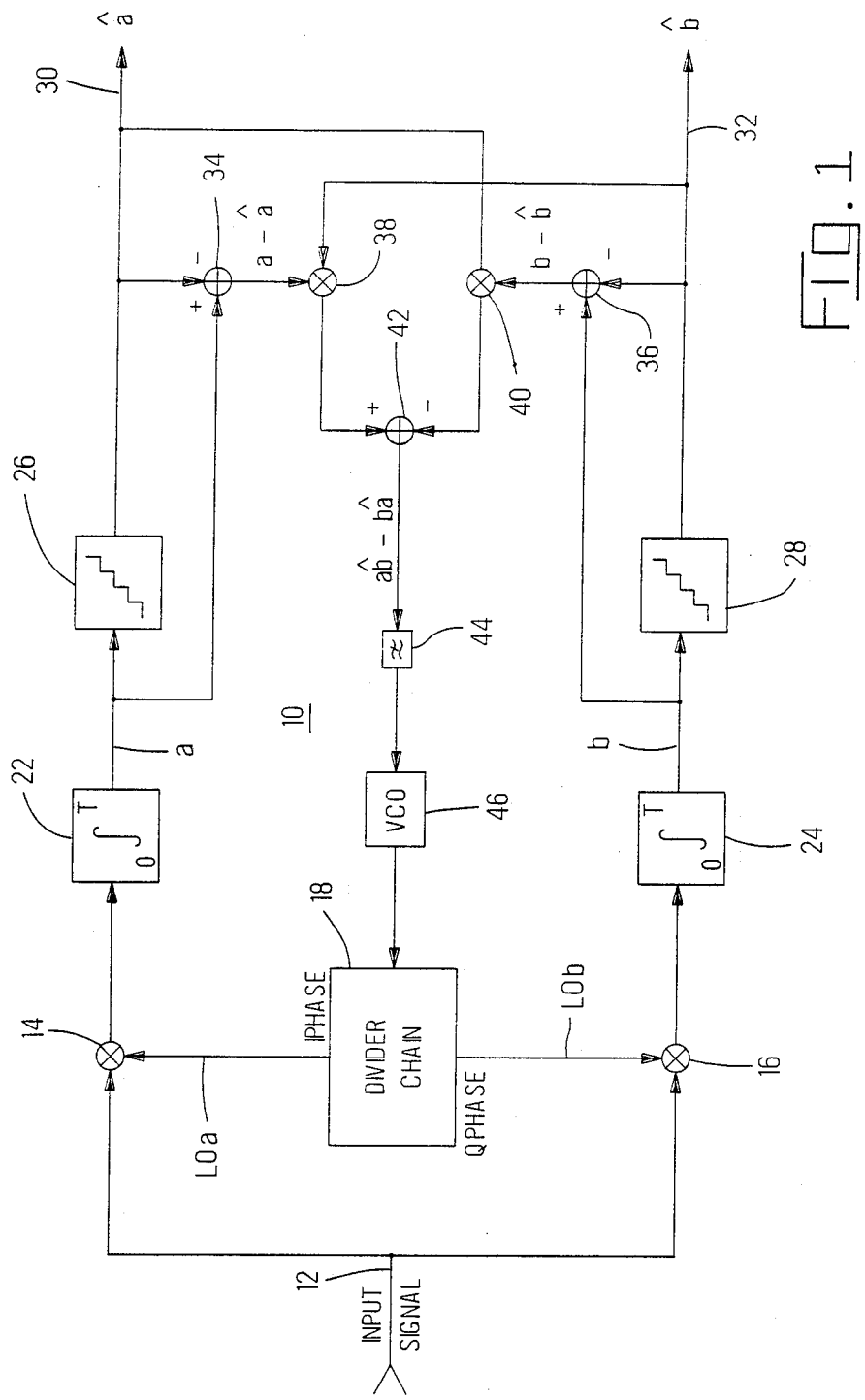
FIG. 1 is a block diagram of a receiver which incorporates a presently preferred embodiment of this invention.
Figure 3A:
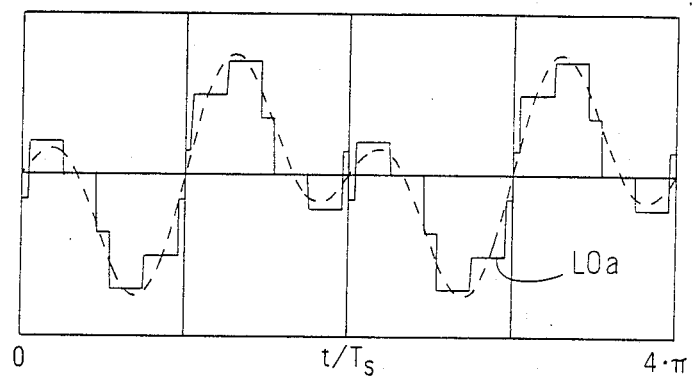
FIGS. 3A and 3B are waveform diagrams of the local oscillator signals LOa and LOb of FIG. 1.
Figure 3B:
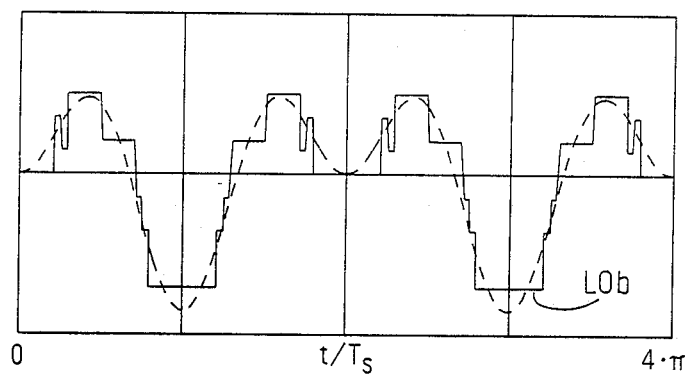

FIG. 1 shows a receiver 10 that incorporates a presently preferred embodiment of this invention. This receiver 10 is responsive to a composite input signal on line 12. It acts to demodulate the signal to generate digital output signals â and b̂ on lines 30, 32. The nature of the preferred input signal on line 12 will be described below in conjunction with FIG. 2. The receiver 10 includes two multipliers 14, 16. Each multiplies the input signal on line 12 with a respective demodulation reference signal or local oscillator signal LOa, LOb. The two local oscillator signals LOa, LOb are generated by a divider chain 18, and are mutually orthogonal. For example, the two local oscillator signals LOa, LOb can be sine and cosine functions at the same frequency FIGS. 3a and 3b show the preferred signals for LOa and LOb of this embodiment. The divider chain 18 itself does not form part of this invention. A preferred arrangement for the divider chain 18 is disclosed in copending U.S. Pat. application Ser. No. 07/427,281 filed concurrently, entitled "Local Oscillator Signal Generating System for Digital Demodulator", the disclosure of which is hereby incorporated by reference.

Each of the multipliers 14, 16 generates a respective product signal which is integrated for a time equal to a symbol period (800 nanoseconds in this embodiment) in an integrator 22, 24. The resulting integrated values a, b are applied to digitizers 26, 28 to generate digitized values â and b̂.

Because the local oscillator signals LOa, LOb are mutually orthogonal and selected to provide product signals that integrate to a non-zero value over a symbol period, the integrated values a, b generated by the integrators 22, 24 should be at one of the four digital amplitudes +3, +1, −1, −3 encoded in the input signal 12. To the extent that the integrated values a, b deviate from these expected values, such deviations are indicative of either amplitude or phase errors. The system disclosed in FIG. 1 operates to eliminate phase errors.

In order to reduce phase errors to zero between the local oscillator signals LOa, LOb and the input signal, the embodiment of FIG. 1 includes summers 34, 36. Each generates a respective error signal as a function of the difference between one of the integrated values a, b and the respective digitized value â, b̂. Thus, the error signal generated by the summer 34 is equal to a-â, and the error signal generated by the summer 36 is equal to b-b̂.

In multipliers 38, 40 the error signals a-â, b-b̂ are multiplied by the digitized values b̂, â, respectively, to generate feedback signals which are summed with opposite signs in a summer 42. The resulting control signal is equal to ab̂-bâ and is applied as an input to a low pass filter 44. The filtered control signal is then used to control a voltage controlled oscillator 46. As explained in the above-identified specification, the divider chain 18 is responsive to the voltage controlled oscillator 46, and by varying the phase of the voltage controlled oscillator 46 the system of FIG. 1 ensures that the local oscillators LOa, LOb are synchronized with the input signal 12.

In order better to define the environment of this invention, FIG. 2 shows a block diagram of a transmitter 50 that can be used to generate the input signal on line 12. This transmitter 50 includes four data signals D1-D4, and each of these data signals can be in any of four digital states (+3, +1, −1, −3). The four data signals D1-D4 are modulated with orthogonal modulating signals sin (1.5x), cos (1.5x), sin (3.5x), cos (3.5x) in respective multipliers 52, 54, 56, 58. In FIG. 2, x is equal to $2\pi t/t_s$, where $T_s$ is equal to 800 nanoseconds. The modulated data signals D1, D2 are summed in a summer 60, and the resulting signal is multiplied by an envelope signal sin (x/2) in a multiplier 64. Similarly, the modulated data signals D3, D4 are summed in a summer 62 and multiplied by the envelope signal sin (x/2) in a multiplier 62. The resulting signals are combined in a summer 68 and then applied to a twisted pair line 12 via a line interface 70.

In each case, the data signals D1-D4 retain their value throughout any given transmitted symbol period $T_s$. Because each of the four components encodes one of four levels, the resulting composite signal on line 12 can be characterized as a 16 quadrature amplitude modulated (16 QAM) signal. The modulating signals at 1.5x and 3.5x are suppressed carriers, and the envelope at x/2 creates two side bands for each suppressed carrier. Thus, the composite signal is characterized by a frequency spectrum emphasizing the frequencies 1x, 2x, 3x and 4x. Further details of the transmitter 50 shown in FIG. 2 can be found in the above-identified specification.

It will be noted that the transmitter 50 generates a composite signal on line 12 having four orthogonal channels, while the receiver 10 of FIG. 1 processes only two orthogonal channels. Typically, the receiver 10 will include another circuit (not shown) similar to that shown for the remaining two orthogonal signals.

Figure 4B:
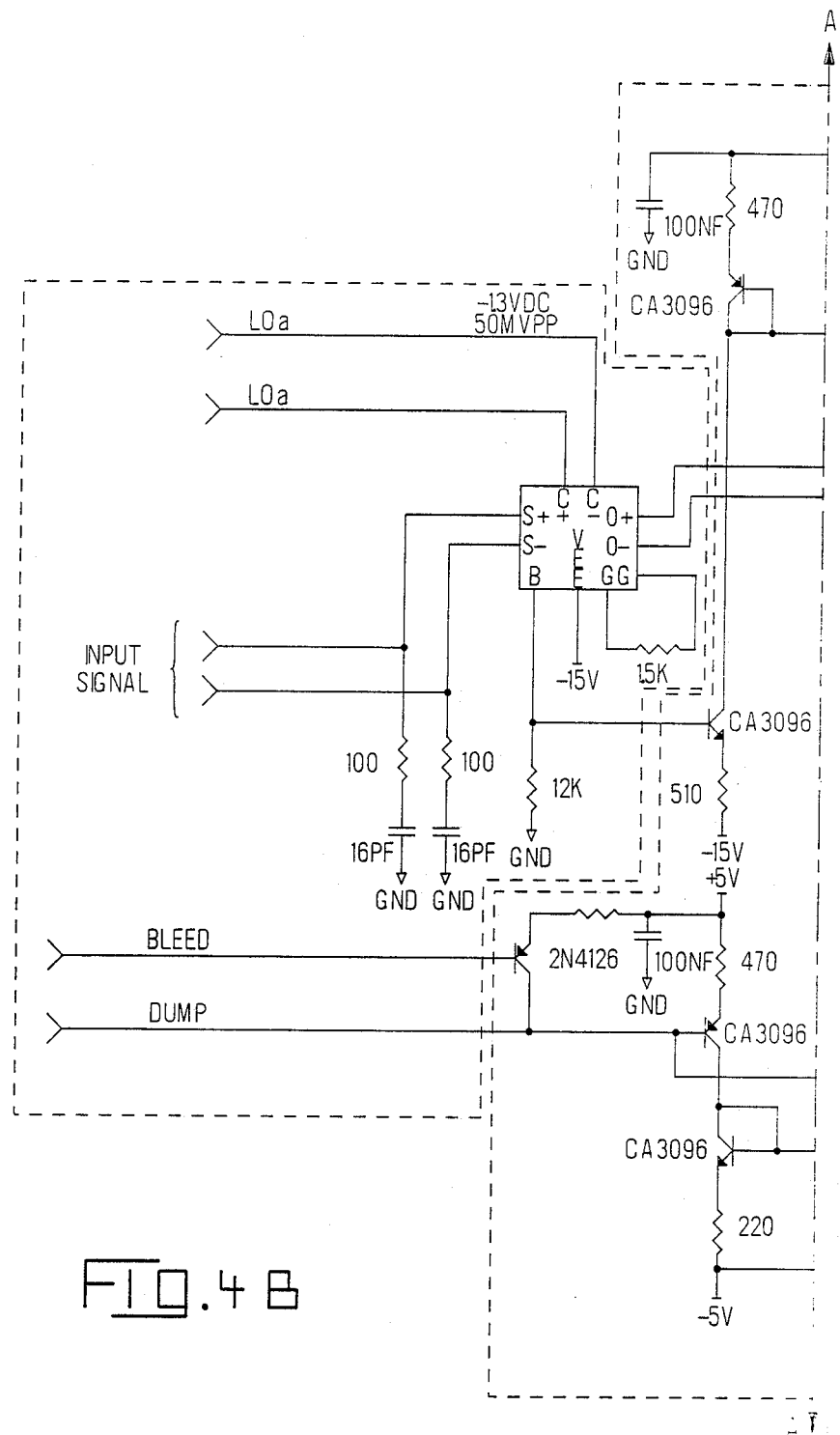
FIGS. 4a(consisting of FIGS. 4A–4E)–4b are schematic diagrams of preferred forms of selected components of FIG. 1.
Figure 4C:
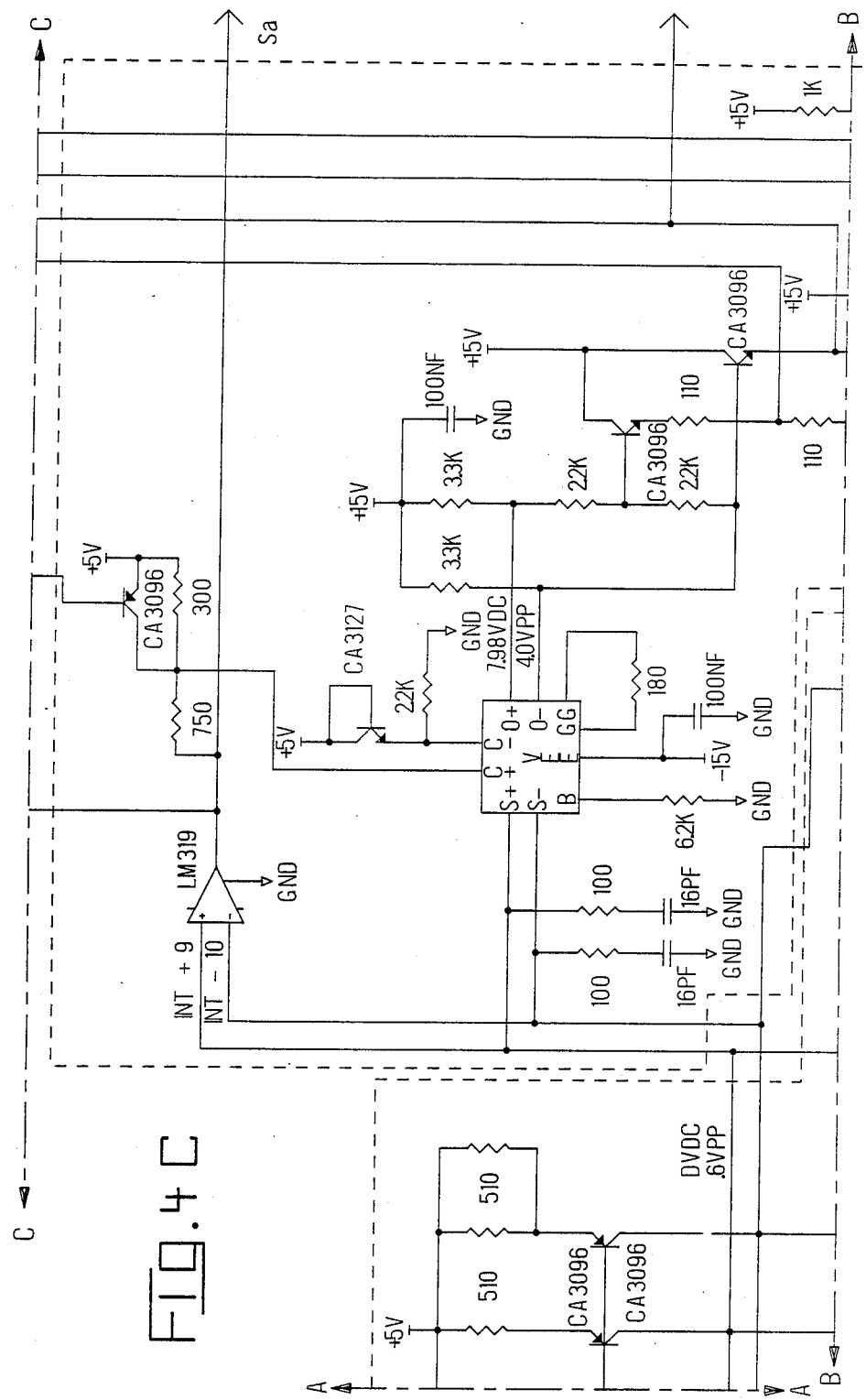
Figure 4B:
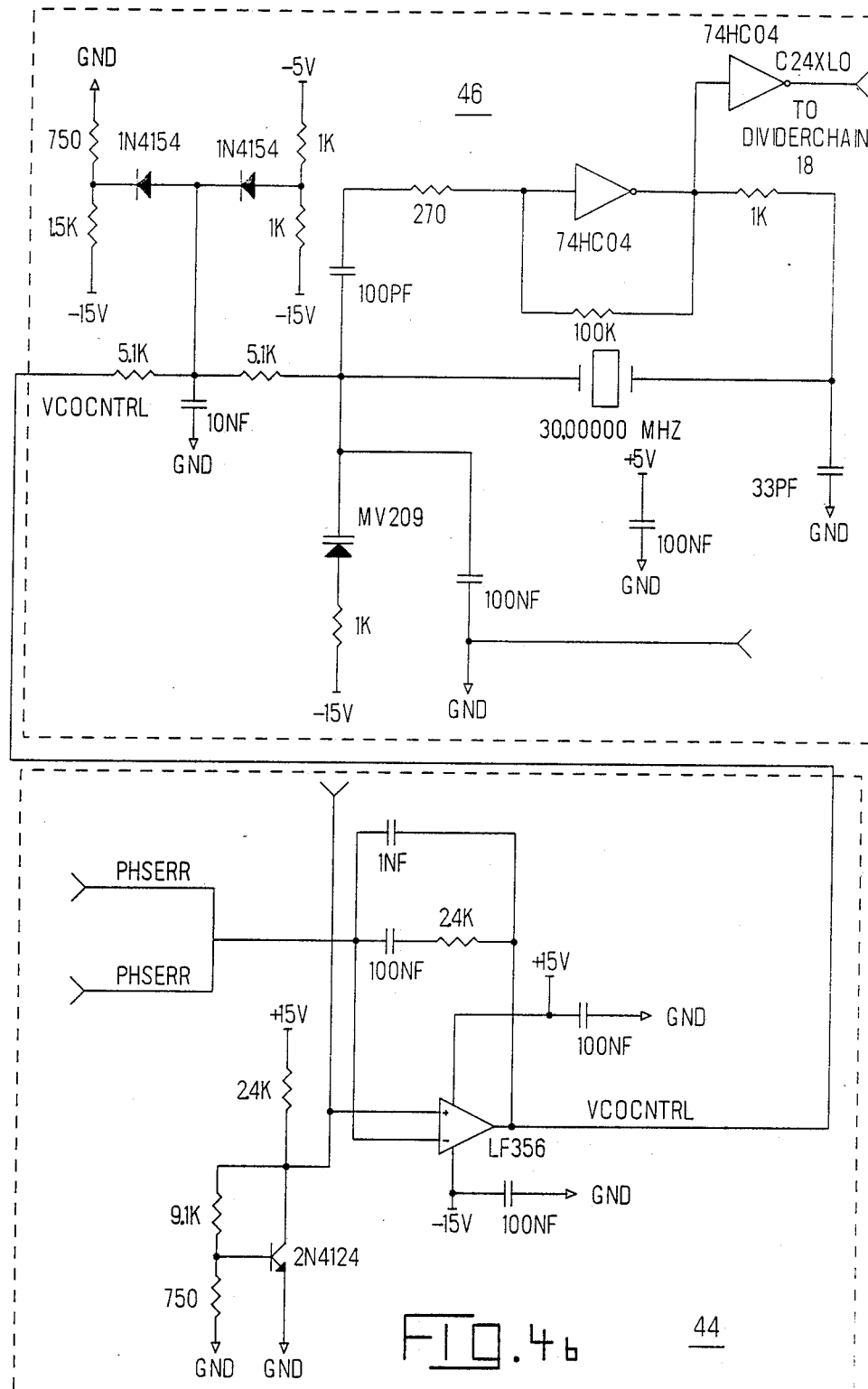

FIGS. 4a-4b provide detailed schematic diagrams of the presently preferred embodiments of the multiplier 14, integrator 22, digitizer 26, and additional components 34, 36, 42-46 of FIG. 1. As pointed out above, the divider chain 18 is fully disclosed in the above-identified specification which is hereby incorporated by reference for its teaching of the structure and operation of the divider chain 18.

In FIGS. 4a-4b, the block labeled 34, 38 receives an input OSIGN, which is the sign bit of b̂ and therefore a one bit approximation of b̂. This circuit generates PHSERR, which corresponds to (a-â)b̂, in FIG. 1. Elements 16, 24, 28, 36, 40 correspond in structure to the elements 14, 22, 26, 34, 38 of FIGS. 4a-4b. The input signal PHSERRLO to the loop filter 44 is a current mode signal which is a wired sum from the two outputs PHSERR from the multipliers 38, 40.

An important advantage of the embodiment of FIG. 1 is that the multipliers 38, 40 are not required to operate with a wide range of analog inputs. The analog input to the multiplier 38 is equal to a-â, which is typically much small than either a or â. Similarly, the multiplier 40 is provided with an analog input equal to b-b̂ which is much smaller than either b or b̂ when the circuit is close to equilibrium. Because the analog input range for the multipliers 38, 40 is much reduced as compared to the prior art systems described above, the multipliers 38, 40 can be simplified in structure. This reduces the cost of the multipliers 38, 40, and therefore the cost of the overall receiver 10.

Of course, the detailed schematic diagrams referenced above have been provided only to illustrate the best mode of this invention, and those skilled in the art will recognize that the functions defined in FIG. 1 can be implemented with a wide variety of hardware.

In the claims:

1. In a digital demodulator of the type comprising means for multiplying an input signal with first and second orthogonal demodulation reference signals to generate respective product signals, means for integrating the product signals to generate first and second integrated values indicative of digital data encoded in the input signal, and means for digitizing the integrated values to generate first and second digital values, the improvement comprising:

first means for generating a first error signal indicative of the difference between the first integrated value and the first digital value;

second means for combining the first error signal with the second digital value to generate a first feedback signal;

third means for utilizing the first feedback signal to generate a control signal indicative of a phase difference between the input signal and the demodulation reference signals.

2. The invention of claim 1 wherein the third means comprises:

fourth means for generating a second error signal indicative of the difference between the second integrated value and the second digital value;

fifth means for combining the second error signal with the first digital value to generate a second feedback signal; and sixth means for generating the control signal as a function of the difference between the first and second feedback signals.

3. The invention of claim 1 wherein the second means comprises means for multiplying the first error signal by the second digital value.

4. The invention of claim 2 wherein the fifth means comprises means for multiplying the second error signal by the first digital value.

5. The invention of claim 2 wherein the sixth means comprises means for subtracting the second feedback signal from the first feedback signal.

6. The invention of claim 1 wherein the first and second reference signals each comprise at least one sinusoidally modulated component and differ from one another in phase by 90°.

7. The invention of claim 1 wherein the digitizing means digitizes the integrated values to four levels.

* * * * *

UNITED STATES PATENT OFFICE
CERTIFICATE OF CORRECTION

Patent No. 4,959,844          Dated September 25, 1990

Inventor(s) Patrick K. Walp

It is certified that error appears in the above-identified patent and that said Letters Patent is hereby corrected as shown below:

In the Abstract:

Line 8 - ($\hat{a}$,b) should be --($\hat{a},\hat{b}$)--.

Line 8 - (a-$\hat{a}$) should be --(a-$\hat{a}$)--.

Line 12 - (b) should be --($\hat{b}$)--.

Line 14 - (ab-b$\hat{a}$) should be --(a$\hat{b}$-b$\hat{a}$)--.

Signed and Sealed this

Tenth Day of December, 1991

Attest:

HARRY F. MANBECK, JR.

*Attesting Officer*          *Commissioner of Patents and Trademarks*